United States Patent
Mugg

(10) Patent No.: US 9,666,086 B2
(45) Date of Patent: May 30, 2017

(54) METHOD AND APPARATUS FOR TEACHING POWER DISTRIBUTION

(71) Applicant: Denton County Electric Cooperative Inc., Corinth, TX (US)

(72) Inventor: Dan Mugg, Keller, TX (US)

(73) Assignee: Denton County Electric Cooperative Inc., Corinth, TX (US)

( * ) Notice: Subject to any disclaimer, the term of this patent is extended or adjusted under 35 U.S.C. 154(b) by 330 days.

(21) Appl. No.: 14/292,559

(22) Filed: May 30, 2014

(65) Prior Publication Data

US 2015/0348426 A1 Dec. 3, 2015

(51) Int. Cl.
| | |
|---|---|
| *G09B 1/40* | (2006.01) |
| *G09B 25/02* | (2006.01) |
| *A63F 3/00* | (2006.01) |
| *A63F 9/18* | (2006.01) |
| *A63F 3/04* | (2006.01) |

(52) U.S. Cl.
CPC .............. *G09B 1/40* (2013.01); *G09B 25/02* (2013.01); *A63F 3/001* (2013.01); *A63F 3/00088* (2013.01); *A63F 3/0478* (2013.01); *A63F 9/183* (2013.01)

(58) Field of Classification Search
CPC . G09B 1/40; G09B 25/02; A63F 3/001; A63F 3/0478; A63F 3/00088; A63F 9/183
USPC .................. 434/224, 127; 273/243, 236, 237
See application file for complete search history.

(56) References Cited

U.S. PATENT DOCUMENTS

| | | | |
|---|---|---|---|
| 3,977,680 A | 8/1976 | Lavine | |
| 5,683,087 A * | 11/1997 | Henshaw | ................ A63F 9/183 273/237 |
| 5,839,729 A | 11/1998 | Watanabe | |
| 5,992,852 A * | 11/1999 | Brooks | ............... A63F 3/00088 273/236 |
| 6,755,418 B1 | 6/2004 | Jackson | |
| 6,932,342 B2 | 8/2005 | Hardie et al. | |
| 7,014,190 B2 | 3/2006 | Yu | |
| 2005/0133996 A1* | 6/2005 | Jenkins | ................... A63F 3/001 273/243 |

(Continued)

OTHER PUBLICATIONS

Power Grid (board game), retrieved from the internet: http://en.wikipedia.org/wiki/Power_grid_game, Apr. 2007.*

(Continued)

*Primary Examiner* — Robert J Utama
*Assistant Examiner* — Eddy Saint-Vil
(74) *Attorney, Agent, or Firm* — Gardere Wynne Sewell LLP

(57) ABSTRACT

A method and apparatus for teaching power distribution with an educational board game includes providing a game board that includes a power station location, power pole locations, and a target building location. A power pole indicator is placed at a power pole location and a power line indicator is connected from the power station location to the power pole indicator during the player's turn. Additional power pole indicators are positioned at additional power pole locations during the player's subsequent turns and the power line indicator is connected from the power station location to the target building location via the power pole indicator and the additional power pole indicators.

20 Claims, 3 Drawing Sheets

(56) References Cited

U.S. PATENT DOCUMENTS

2009/0275003 A1* 11/2009 Green .................. A63F 3/0478
434/127

OTHER PUBLICATIONS

Power Distribution, retrieved from the internet: http://www.iitk.ac.in/infocell/Archive/dirmar1/power_distribution.html, Mar. 1999.*

* cited by examiner

*122*

|  | Contracts $ | Power Poles | Underground Locations | Building Points | Total |
|---|---|---|---|---|---|
| GREEN |  |  |  |  |  |
| BLUE |  |  |  |  |  |
| YELLOW |  |  |  |  |  |
| RED |  |  |  |  |  |

| | | | | | | | Power Poles | | | | | | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 |
| Underground Locations | 0 | - | 2 | 4 | 6 | 8 | 10 | 12 | 14 | 16 | 18 | 20 | 22 | 24 | 26 | 28 | 30 | 32 | 34 | 36 | 38 | 40 |
| | 1 | 3 | 5 | 7 | 9 | 11 | 13 | 15 | 17 | 19 | 21 | 23 | 25 | 27 | 29 | 31 | 33 | 35 | 37 | 39 | 41 | 43 |
| | 2 | 6 | 8 | 10 | 12 | 14 | 16 | 18 | 20 | 22 | 24 | 26 | 28 | 30 | 32 | 34 | 36 | 38 | 40 | 42 | 44 | 46 |
| | 3 | 9 | 11 | 13 | 15 | 17 | 19 | 21 | 23 | 25 | 27 | 29 | 31 | 33 | 35 | 37 | 39 | 41 | 43 | 45 | 47 | 49 |
| | 4 | 12 | 14 | 16 | 18 | 20 | 22 | 24 | 26 | 28 | 30 | 32 | 34 | 36 | 38 | 40 | 42 | 44 | 46 | 48 | 50 | 52 |
| | 5 | 15 | 17 | 19 | 21 | 23 | 25 | 27 | 29 | 31 | 33 | 35 | 37 | 39 | 41 | 43 | 45 | 47 | 49 | 51 | 53 | 55 |
| | 6 | 18 | 20 | 22 | 24 | 26 | 28 | 30 | 32 | 34 | 36 | 38 | 40 | 42 | 44 | 46 | 48 | 50 | 52 | 54 | 56 | 58 |
| | 7 | 21 | 23 | 25 | 27 | 29 | 31 | 33 | 35 | 37 | 39 | 41 | 43 | 45 | 47 | 49 | 51 | 53 | 55 | 57 | 59 | 61 |
| | 8 | 24 | 26 | 28 | 30 | 32 | 34 | 36 | 38 | 40 | 42 | 44 | 46 | 48 | 50 | 52 | 54 | 56 | 58 | 60 | 62 | 64 |
| | 9 | 27 | 29 | 31 | 33 | 35 | 37 | 39 | 41 | 43 | 45 | 47 | 49 | 51 | 53 | 55 | 57 | 59 | 61 | 63 | 65 | 67 |
| | 10 | 30 | 32 | 34 | 36 | 38 | 40 | 42 | 44 | 46 | 48 | 50 | 52 | 54 | 56 | 58 | 60 | 62 | 64 | 66 | 68 | 70 |

FIG. 3B

METHOD AND APPARATUS FOR TEACHING POWER DISTRIBUTION

TECHNICAL FIELD

This disclosure relates to a method and apparatus for teaching power distribution, and in particular, to a board game adapted to teach players basic principles of power distribution.

BACKGROUND OF THE DISCLOSURE

Educational games provide a way to teach principles to the players of the game in an entertaining and interactive manner. Educational games can illustrate complex topics in a manner that is understandable to the players and, in some cases, can engage multiple senses of the players (e.g., sight, touch, smell, sound and taste) to enhance the player's learning experience.

A topic that is often difficult to teach and understand is the distribution of power from one or more power stations to various destinations throughout a geographic area. A complete understanding of power distribution also includes a basic knowledge of purchasing, constructing and maintaining power poles, underground power lines and other power distribution mechanisms. In some cases, power distribution also involves the licensing of power distribution mechanisms between entities, such as, for example, between competing power distribution companies. In view of the potential complexity of these topics, there is a need for an educational game to teach the principles of power distribution in an understandable, entertaining and interactive manner.

SUMMARY

In a first aspect, there is described a method for teaching power distribution with an educational board game that includes providing a game board that includes a power station location, a power pole location and a target building location. The method also includes placing a power pole indicator at the power pole location during a player's turn and connecting a power line indicator from the power station location to the power pole indicator during the player's turn. The method also includes placing an additional power pole indicator at an additional power pole location during the player's subsequent turn and connecting the power line indicator from the power station location to the target building location via the power pole indicator and the additional power pole indicator.

In some embodiments, the method also includes terminating game play when a player connects the player's power station to the player's target building location via the power pole indicator and the additional power pole indicator.

In some other embodiments, the game board includes an underground power line location.

In still other embodiments, the method includes placing an underground power line indicator at the underground power line location and connecting the power line indicator to the underground power line indicator.

In another embodiment, the method includes retrieving from a player a specified amount of monetary indicators for each power pole indicator or underground power line indicator placed on the game board by the player.

In still another embodiment, one or more building locations are located on the game board between the power station and the target building.

In yet another embodiment, the method includes placing a building claim indicator on a building location adjacent to a player's power pole indicator.

In some embodiments, the power pole locations include a stand and the step of placing a power pole indicator at the power pole location further includes placing the power pole indicator in an upright position in the stand.

In some other embodiments, connecting a power line indicator from the power station location to the target building location via the power pole indicator and the additional power pole indicator includes connecting the power line indicator to a vertical end of an upright power pole indicator and an upright additional power pole indicator.

In a second aspect, there is described a method of playing an educational board game to teach power distribution that includes providing a game board that includes power pole locations, building locations, underground power line locations, a power station location and a target building location. The method also includes placing one of a power pole indicator and an underground power line indicator at a power pole location or an underground power line location, respectively, at a player's turn. The method also includes connecting a power line indicator between the power station location and the power pole indicator or the underground power line indicator chosen by the player.

In some embodiments, connecting the power line indicator between the power station location and the power pole indicator includes connecting the power line indicator between the power station location and an upright end of the power pole indicator.

In other embodiments, the method includes connecting the power line indicator between the upright end of a first power pole indicator and an upright end of a second power pole indicator.

In some other embodiments, the method includes placing an action card between two power pole locations, wherein the action card indicates an action to be completed by a player.

In still other embodiments, the method includes distributing an amount of monetary indicators to a player at a beginning of the player's turn corresponding to a number of buildings claimed by the player.

In yet other embodiments, the method includes collecting an amount of monetary indicators from a player for each power line indicator purchased by the player.

In another embodiment, the method includes declaring a winner based on a value associated with the number of building indicators, power line indicators and underground power line indicators used by each player.

In yet another embodiment, the method includes terminating game play when a player connects the power station location to the target building location with a power line indicator via one or more of the power pole locations or the underground power line locations.

In a third aspect, there is described an apparatus for playing an educational game for teaching power distribution that includes a game board that includes building locations, a power station location, power pole locations, underground power line locations and a target building location. The apparatus also includes a power line indicator connectable between the power station location and the target building location via one or more of the power pole locations and the underground power line locations. The apparatus includes a power pole indicator couplable to the game board at the power pole locations and an underground power line indicator coupleable to the game board at the underground power line locations.

In some embodiments, the apparatus includes actions cards located between adjacent power pole locations.

In other embodiments, the apparatus includes miniature buildings located on the building locations.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

FIG. 3A is a view of an exemplary score card for use in a method and apparatus for teaching power distribution in accordance with this disclosure.

FIG. 3B is a view of an exemplary chart to determine point values in a method and apparatus for teaching power distribution in accordance with this disclosure.

DETAILED DESCRIPTION

FIGS. 1-3B show a game board 102, game components for use with the game board 102, an exemplary score card 122 and an exemplary point chart for use in a method and apparatus for teaching power distribution. As will be discussed in more detail below, the method and apparatus provide players with an opportunity to learn about power distribution in an entertaining and interactive manner as players attempt to be the first to deliver power from the player's power station to a target building by way of the player's power line. At each turn, the player receives income from its operations and has the chance to purchase additional power poles or underground power lines to transport power from the player's power station toward the target building. The player can claim the right to provide power to buildings that are adjacent to the player's power lines to earn additional income at each turn. In some embodiments, actions cards on the game board 102 teach the players real-life situations faced by power distribution companies, as will be described in more detail below. In some embodiments, the game board 102 includes three-dimensional buildings, power poles, underground power boxes and other features to create a "real-life" setup from which the players can learn principles of power distribution.

Figure 1:
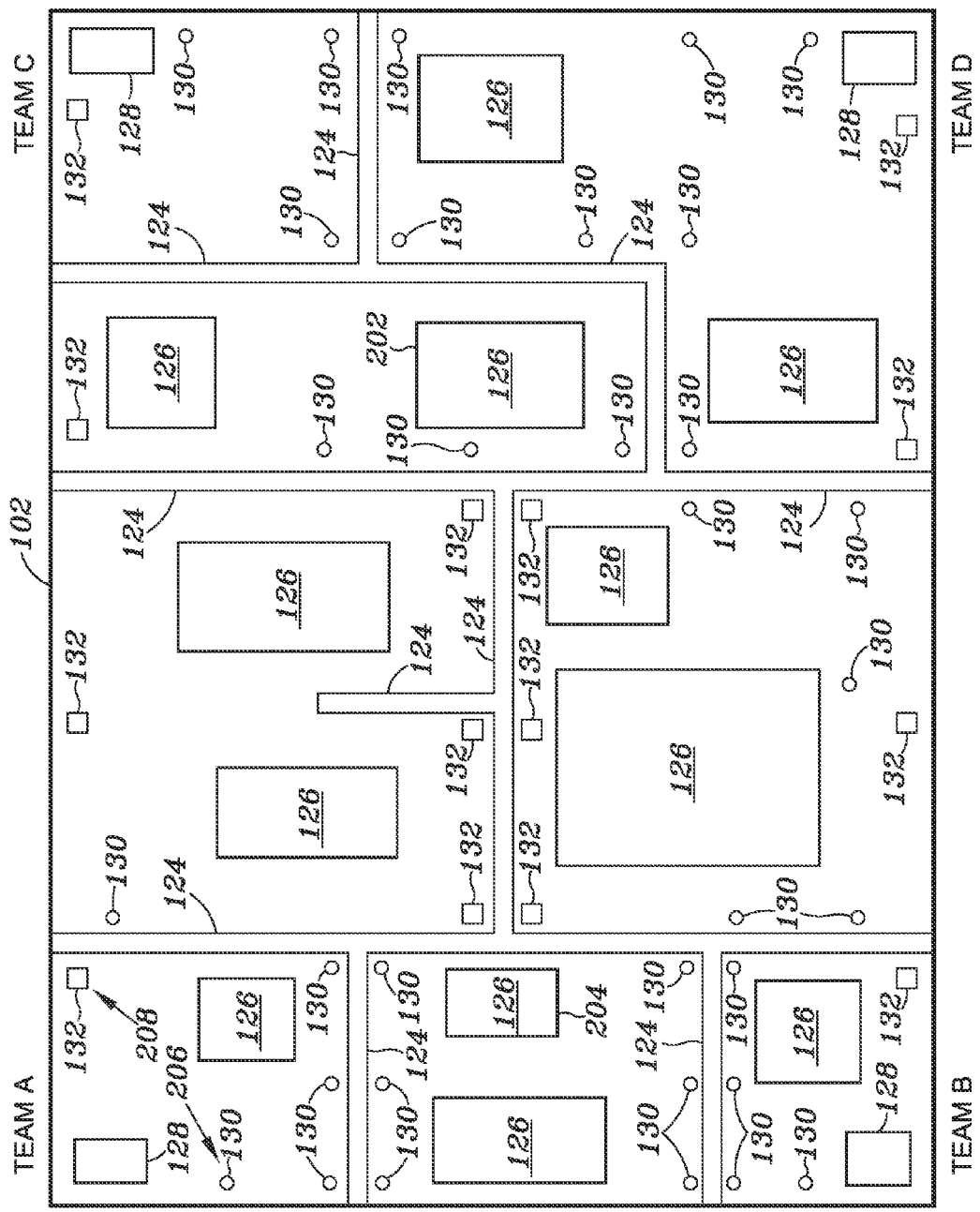
FIG. 1 is a view of a game board for use in a method and apparatus for teaching power distribution in accordance with this disclosure.

FIG. 1 shows a game board 102 used in conjunction with a method and apparatus for teaching power distribution. The game board 102 includes street designators 124, building locations 126, power station locations 128, power pole locations 130 and underground power line locations 132 at various positions on the game board 102 to simulate the layout of a real city. For example, in some embodiments, the game board 102 includes a city-like layout of street designators 124 and three-dimensional buildings (not shown) at the building locations 126. The three-dimensional buildings are of various sizes and shapes, simulating buildings in a city and, in some embodiments, several different types of buildings are included on the game board 102, such as, for example, restaurants, gas stations, residential buildings, skate parks, commercial buildings and stores.

In the game board 102 illustrated in FIG. 1, the power station locations 128 are located at the corners of the game board 102. Each power station location 128 represents a starting point for a player or team of players to begin power distribution. In some embodiments, miniature power station buildings are located at the power station locations 128 on the game board 102.

To allow players to connect their power station locations 128 to a target building location 126, power pole locations 130 and underground power line locations 132 are dispersed throughout the game board 102. The power pole locations 130 are generally located adjacent to the street designators 124, similar to the location of power poles in a city. In some embodiments, the power pole locations 130 include a stand (not shown) to hold a three-dimensional power pole indicator 106 (FIG. 2A) in an upright position, as will be described in more detail below. In the embodiment illustrated in FIG. 1, the underground power line locations 132 are spaced from each other by distances that are greater than the distances between the power pole locations 130 to represent the efficiency of underground power distribution in some cities.

Although the game board 102 is rectangular in the embodiment illustrated in FIG. 1, the game board 102 may be any suitable shape. In addition, any suitable configuration of building locations 126, road designators 124, power pole locations 130 and underground power line locations 132 may be implemented in the game board 102. In some embodiments, the game board 102 includes synthetic grass, trees, three-dimensional miniature figurines and other features to decorate the game board 102.

Figure 2A:
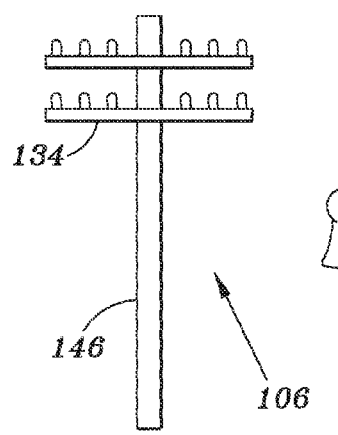
FIG. 2A is a view of an exemplary power pole indicator for use in a method and apparatus for teaching power distribution in accordance with this disclosure.

FIGS. 2A-2H show exemplary game components for use with the game board 102. Referring to FIG. 2A, a power pole indicator 106 is shown that includes a three-dimensional pole-shaped piece 146 and lateral extensions 134 to hold the power line indicators 108 (FIG. 2B) in a manner similar to actual utility poles in a real city. In some embodiments, a bottom portion of the pole-shaped pieces 146 is coupleable to stand located at the power pole locations 130 on the game board 102 to hold the power pole indicators 106 in an upright orientation.

Figure 2B:
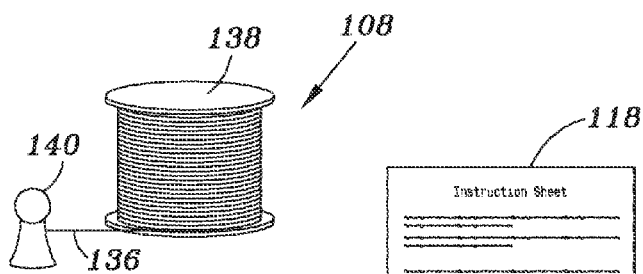
FIG. 2B is a view of an exemplary power line indicator for use in a method and apparatus for teaching power distribution in accordance with this disclosure.

Referring to FIG. 2B, a power line indicator 108 is shown that includes an elongated line 136 used to couple a power station location 128 to power pole indicators 106 and underground power line indicators 114. In the embodiment illustrated in FIG. 2B, the elongated line 136 is stored on a spool 138 and includes a miniature figurine 140 located at one end of the elongated line 136. In some embodiments, each power line indicator 108 has a unique color to differentiate the power line indicator 108 of each team from the power line indicators 108 of the other teams. In some embodiments, the color of each power line indicator 108 matches the color of one of the power station locations 128.

Figure 2C:
FIG. 2C is a view of an instruction sheet for use in a method and apparatus for teaching power distribution in accordance with this disclosure.

Referring to FIG. 2C, an instruction sheet 118 is illustrated that includes instructions dictating how the game is to proceed.

Figure 2D:
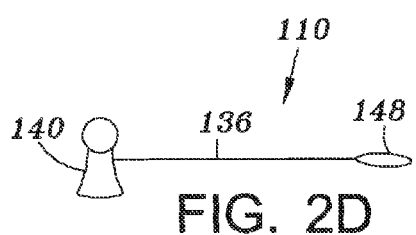
FIG. 2D is a view of an exemplary connecting power line indicator for use in a method and apparatus for teaching power distribution in accordance with this disclosure.

Referring to FIG. 2D, a power line extension indicator 110 is shown that includes a colored elongated line 136, a coupling mechanism 148 and a miniature figurine 140. The coupling mechanism 148 is configured to couple the elongated line 136 of the power line extension indicator 110 to a power line indicator 108 to allow a team to branch from their power line indicator 108 to reach power pole locations 130 and/or underground power line locations 132 outside of the path of the power line indicator 108.

Figure 2E:
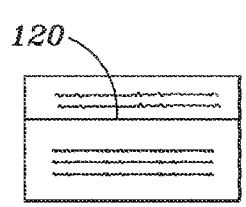
FIG. 2E is a view of exemplary action cards for use in a method and apparatus for teaching power distribution in accordance with this disclosure.

Referring to FIG. 2E, action cards 120 are shown that include actions to be completed by a player or team upon receipt of the action card 120. The action cards 120 are randomly placed on the game board 102 between adjacent power pole locations 130 or underground power line locations 132, as discussed below in more detail.

Figure 2F:
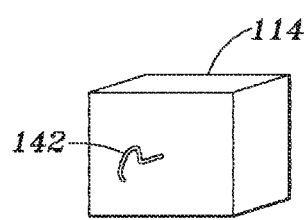
FIG. 2F is a view of an exemplary underground power line indicator for use in a method and apparatus for teaching power distribution in accordance with this disclosure.

Referring to FIG. 2F, an underground power line indicator 114 is shown that includes a three-dimensional rectangle includes a hook 142 to removably couple the underground power line indicator 114 to a power line indicator 108. In some embodiments, the underground power line indicator 114 includes a magnetic material to facilitate magnetic coupling to a metallic underground power line location 132.

Figure 2G:
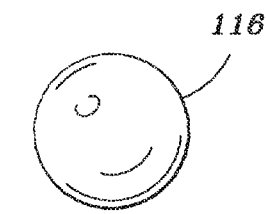
FIG. 2G is a view of an exemplary building claim indicator for use in a method and apparatus for teaching power distribution in accordance with this disclosure.

Referring to FIG. 2G, a building claim indicator 116 is shown that includes spherical three-dimensional object used to designate possession of a building location 126 by a team. In some embodiments, the building claim indicators 116 include colored lights corresponding to a team's designated color. Any suitable object can be used as a building position indicator 116.

Figure 2H:
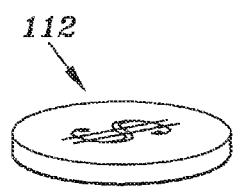
FIG. 2H is a view of a monetary indicator for use in a method and apparatus for teaching power distribution in accordance with this disclosure.

Referring to FIG. 2H, an exemplary monetary indicator 112 is shown. The monetary indicators 112 may be chips of various colors, styles and/or sizes to designate monetary values. Any suitable monetary indicator 112 can be used, such as paper bills, for example, to represent money earned and spent by a team during a game, similar to the money earned and spent by a power company.

FIG. 3A illustrates an embodiment of a scorecard 122 for use in the method and apparatus for teaching power distribution. The score card 122 provides a convenient location for keeping track of the score of a game. The score card 122 provides spaces to record "contract money," "power poles," "underground locations," "building points" and "total points" for each team. FIG. 3B illustrates an embodiment of a chart 144 to easily determine a point value associated with a specified number of power pole indicators 106 and underground power line indicators 114 owned by a team, as will be described in more detail below.

An example embodiment of a method for playing a board game to teach power distribution starts by dividing the players into teams. Each team selects a power station location 128 that is associated with a unique color. Each team is given a power line indicator 108 matching the team's color, one or more power line extension indicators of the same color, and an amount of monetary indicators 112. A game moderator selects a building location 126 as a target building location 126 for each team. Each team may have the same target building location 126 or the teams may have different target building locations 126. In some embodiments, for example, the teams associated with the power station locations 128 on the same end of the rectangular game board 102 (for example, Teams A & B) have the same designated target building location 126. In some embodiments, for example, the target building location 126 for Teams A and B is the building location 126 designated by the number 202 and the target building location 126 for Teams C and D is the building location 126 designated by the number 204. Action cards 120 are placed on the game board 102 between adjacent power pole locations 130 and/or underground power line locations 132. Each team is given a specified amount of monetary indicators 112 to start the game, such as, for example, $5,000.

A team is chosen for the first turn, such as Team A, and Team A decides whether it would like to purchase a power pole indicator 106 or an underground power line indicator 114. In some embodiments, the cost of a power pole indicator 106 is different than the cost of an underground power line indicator 114. For example, in some embodiments, a power pole indicator 106 costs $1,000 and an underground power line indicator 114 costs $3,000. If Team A decides to purchase a power pole indicator 106, Team A pays for the power pole indicator 106 and then places the power pole indicator 106 at a power pole location 130 adjacent to Team A's power station. For example, Team A can place the power pole indicator 106 at the power pole location 130 designated by the number 206, which is adjacent to Team A's power station location 128. Alternatively, if Team A decides to purchase an underground power line indicator 114, Team A can place the underground power line indicator 114 at a underground power line location 132 adjacent to Team A's power station location 128, such as the underground power line location 132 designated by the number 208. Each team may only place power pole indicators 106 and underground power line indicators 114 at power pole locations 130 and underground power line locations 132, respectively, that are adjacent to the team's power station location 128 or the team's previously purchased power pole indicators 106 or underground power line indicators 114. In some embodiments, however, a team may "lease" a power pole indicator 106 or underground power line indicator 114 from another team as long as the other team's power pole indicator 106 or power line indicator 114 is adjacent to the first team's power line indicator 108, as will be described in more detail below. When a team purchases a power line indicator 108 or an underground power line indicator 114, the team links its power station to the purchased power pole indicator 106 or underground power line indicator 114 with the elongated line 136 of its power line indicator 108. This represents the power lines that link a power station to various locations in a city.

The second team, in this case Team B, then has an opportunity to decide whether to purchase a power pole indicator 106 or an underground power line indicator 114. As described above, Team B can determine where to place the power line indicator 106 or the underground power line indicator 114 from the adjacent power line locations 130 and underground power line locations 132.

The other teams, for example, Teams C and D, then have the opportunity to decide whether to purchase a power pole indicator 106 or an underground power line indicator 114 and can place the power pole indicator 106 or the underground power line indicator 114 at an appropriate power pole location 130 or underground power line location 132 as described above.

Team A then has its second turn. First, Team A receives an amount of monetary indicators 112 at the beginning of its turn, as does each team at the beginning of each turn after the team's first turn. For example, in some embodiments, each team receives monetary indicators 112 corresponding to $1,000 at the beginning of each turn. This is similar to the payments received by a power company for power distribution services sold to its customers. During each team's second and subsequent turns, the team can choose between three options: the team can purchase a power pole indicator 106, purchase an underground power line indicator 114, or, if the team owns a power pole indicator 106 or an underground power line indicator 114 adjacent to a building location 126, the team can claim the building location 126 using one of its building claim indicators 116.

If Team A decides to claim a building location 126, Team A places a building claim indicator 116 corresponding to the color of Team A on the claimed building location 126. A building location 126 may only be claimed if it is adjacent to a power pole indicator 106 or an underground power line indicator 114 owned by the team. When a team claims a building location 126, the team may choose to receive a one-time fee or a recurring payment to be received at the beginning of each of the team's turns. For example, in some embodiments, a team may choose between receiving a one-time fee of $5,000 or a recurring payment at the beginning of each of the team's turns of $2,000. This is similar to the payment received by a power company for providing power to a specific building.

The game proceeds as each team continues to purchase additional power pole indicators 106 and underground power line indicators 114 to link the team's power station 128 to building locations 126 throughout the game board 102. Power pole indicators 106 and the underground power line indicators 114 purchased by a team are linked to previously purchased power poles indicators and underground power line indicators 114 using the elongated line 136 of the team's power line indicator 108. As explained above, each team attempts to form a connection between the team's power station location 128 and the target building location 126 by linking together power pole indicators 106 and underground power line indicators 114. Each team must claim at least 3 building locations 126 before reaching its target building location 202 or 204.

As described above, in some embodiments a team may need to use, or license, a power pole indicator 106 or underground power line indicator 114 of another team in order to reach a desired location. The licensee team may use the licensor team's power pole indicator 106 or underground power line indicator 114 but must pay the licensor team a designated monetary value at the beginning of each of the licensee's turns. For example, in some embodiments, the licensee team must pay the licensor team $500 per turn for the right to use that location. In some embodiments, the licensor team cannot refuse to lease use of a power pole indicator 106 or an underground power line indicator 114 to a potential licensee as long as the power pole indicator 106 or underground power line indicator 114 is positioned adjacent to one of the potential licensee's power pole indicators 106 or underground power line indicators 114.

The game continues until a team connects its power station location 128 to its target building location 126 with its power line indicator 108. At that point, each team totals the number of power pole indicators 106 and underground power line indicators 114 it has purchased, as well as the number of building indicators 116 it has placed on the game board 102. Each power pole indicator 106, underground power line indicator 114 and building indicator 116 has a designated point value. In some embodiments, for example, each power pole indicator 106 is worth 2 points, each underground power line indicator 114 is worth 3 points, and each building indicator 116 is worth various point values depending on the type of the building on the building location 126. For example, in some embodiments, a bank, grocery store, fire station, church, store and theater are each worth 4 points; a skate park and a restaurant are each worth 7 points; a City Hall, a hospital, a gas station and a soccer stadium are each worth 9 points; and the target building is worth 12 points. Each team also receives points for monetary indicators 112 retained by the team at the end of the game. In some embodiments, for example, each $1,000 worth of monetary indicators 112 retained by a team is worth 1 point. The team with the most points wins the game.

In some embodiments, a team crosses an action card 120 as the team connects two adjacent power pole locations 130 or two adjacent underground power line locations 132 with the team's power line indicator 108. The team then reads the action cards 120 that includes actions to be taken by that team or the other teams, and include real life facts and scenarios oftentimes experienced by the power company concerning power distribution. In some embodiments, the action cards 120 include one or more of the actions listed in Table A below.

| Action Card Title | Action Card Text | Card Type |
|---|---|---|
| Tree falls on power line | Dispatch emergency crews and lose last pole placement. Constant maintenance is needed to maintain power lines. Some trees can grow more than four feet in one year! | Risk |
| Lightning strike! | Be safe out there and sit this turn out. During a storm, the service area of a power company can receive more than 25,000 lightning strikes in one hour. | Weather |
| Tech upgrade | Add an extra pole! Some power companies use infrared technology to improve Power Quality and Reliability. | Technology |
| Bird grounded | Repair Crews dispatched. Add $500 to next line section cost. Birds don't get electrocuted when they land on wires because they don't represent a path to the ground. Electricity wants nothing more than to go to the ground and will always do so by the easiest, most direct route. But because some birds have wingspans of more than six feet, that's enough to connect to the ground wire by accident. | Risk |
| Don't text and drive | Player to your right selects a pole to remove from your network. You must replace it before taking other action! The National Highway Traffic and Safety Administration reports that employers in Texas alone spend $3.5 billion every year as a result of on-the-job and off-the-job traffic injuries. | Risk |
| Texas heat wave! | Energy demand spikes, causing higher energy costs. Pay other players $200 each. Some power companies conduct free energy audits on Members' homes and businesses. | Weather |
| Groundbreaking! | New business added to city. Earn additional $1,000 for your most recently acquired building. Some power companies partner with city officials and city economic development groups to encourage growth. | City |
| Line maintenance prevents outage | All other companies pay you $500! Some power companies have webpages where you can report hazards such as sagging power | Technology |

-continued

| Action Card Title | Action Card Text | Card Type |
|---|---|---|
| | lines, leaning poles and tree limbs close to power lines. | |
| It's a twister! | Tornado wreaks havoc on the city. Next acquired building only worth half value ($2,500 upfront or $1,000 per turn). According to the National Oceanic and Atmospheric Administration (NOAA), Texas ranks first in the U.S. in tornadoes, with an average of 139 per year. | Weather |
| New city construction! | City planning requires a new route for you. You cannot add to this line section on your next turn! Some power companies partner with city planners to develop infrastructure and help cities grow! | City |
| Line repair under budget! | Give yourself an extra $500! Unlike investor-owned utilities, some power companies are owned by the people they serve. Members, as we call them, enjoy electricity priced as close to cost as possible. | Technology |
| Call 811 before you dig! | Go underground for this turn! The law requires you to call 811 at least two business days before you dig 16 inches or deeper. | Risk |
| Parade on Main Street! | Extra $1,000 for you if your line currently crosses a road. | City |
| Texas snowstorm! | Fast response from emergency crews earns bonus overhead line section this turn! Some power companies use FACEBOOK and TWITTER to communicate about service disruptions. | Weather |
| Trees and power lines don't mix | Lose the last placed overhead line section. State and federal laws require electric utilities to prune tree limbs away from power lines and electrical equipment. | Risk |
| Free energy audit | $500 headed your way in energy savings. Some power companies conduct free energy audits on a Members' homes and businesses. They may inspect your windows, doors, attics, appliances, heating and cooling unit, and more-all to help pinpoint where your energy dollars are being wasted. | Technology |
| Permit approved! | Additional line requirements needed. Pay an extra $500 for this turn. CoServ Area Managers work with city and elected officials to advocate company positions and initiatives, including line placement and permit disputes. | City |
| Incur line maintenance costs! | If your line currently crosses a road, lose $1,000. Power companies run a tight ship when it comes to the reliability of your electric service. We keep our equipment in tip-top shape and continually improve our state-of-the-art outage response technologies. | Risk |
| Pay now, save later . . . | If you choose, invest $5,000 for Solar Panels to interconnect and gain an extra line section to be used in a later turn. CoServ supports interconnected co-generation, and (funds permitting) offers a Solar Energy Rebate. This program provides a $2 per watt rebate on solar generation up to $5000 per Member. | Technology |
| If you have underground lines | Locate them for others. Collect $500 from each player for your trouble. Vacuum excavation (also known as suction excavation) is considered a best practice for safely locating underground utilities. It reduces the chance - by more than 50 percent - of damaging buried utilities. | City |
| Safety first! | Pay an extra $3,000 for new safety equipment, but gain an extra turn. Electricity has long been recognized as a serious workplace hazard. Occupational Safety & Health Administration (OSHA) electrical standards are designed to protect employees exposed to dangers such as electric shock, electrocution, fires and explosions. | Risk |
| More project engineers | If you have encountered a TECHNOLOGY CARD, gain an extra pole to be used next | Wild Card |
| graduate! | turn! Over the next 10 years, according to the U.S. Bureau of Labor Statistics, 5 out of 8 new jobs and 8 out of 10 of the highest-paying positions in the United States will be in careers related to science, technology, education, and math (STEM) subjects. | |
| Re-zoned! | If you have encountered a CITY CARD, gain an underground line to be used next turn! Underground lines are more expensive to install and maintain, resulting in increased electric rates that could cost up to 10 times more than overhead distribution or transmission lines. | Wild Card |
| Weather is tough on equipment! | If you have encountered a WEATHER CARD, lose an overhead pole. OR if you have encountered a RISK CARD, lose an underground location. | Wild Card |

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method for teaching power distribution with an educational board game, comprising:
providing a game board that includes a power station location, a power pole location comprising a stand and a target building location;
placing a power pole indicator at the power pole location during a player's turn by placing the power pole indicator in an upright position in the stand;
connecting a power line indicator from the power station location to the upright power pole indicator during the player's turn,
the power line indicator comprising an elongated line stored on a spool and having a miniature figurine at an end of the elongated line and coupleable between the power station location and the upright power pole indicator;

placing an upright additional power pole indicator at an additional power pole location during the player's subsequent turn; and connecting the power line indicator from the power station location to the target building location via the power pole indicator and the additional power pole indicator.

2. The method of claim 1, further comprising terminating game play when a player connects the player's power station to the player's target building location via the power pole indicator and the additional power pole indicator.

3. The method of claim 1, wherein the game board includes an underground power line location.

4. The method of claim 3, further comprising placing an underground power line indicator at the underground power line location and connecting the power line indicator to the underground power line indicator.

5. The method of claim 4, further comprising retrieving from a player a specified amount of monetary indicators for each power pole indicator or underground power line indicator placed on the game board by the player.

6. The method of claim 1, further comprising one or more building locations located on the game board between the power station and the target building.

7. The method of claim 6, further comprising placing a building claim indicator on a building location adjacent to a player's power pole indicator.

8. The method of claim 1, wherein connecting the power line indicator from the power station location to the target building location via the power pole indicator and the additional power pole indicator comprises connecting the power line indicator to a vertical end of the upright power pole indicator and the upright additional power pole indicator.

9. A method of playing an educational board game to teach power distribution, comprising:
    providing a game board that includes power pole locations, building locations, underground power line locations, a power station location and a target building location;
    providing action cards placed between a pair of the power pole locations or a pair of the underground power line locations;
    at a player's turn, placing one of a power pole indicator and an underground power line indicator at a power pole location or an underground power line location, respectively;
    connecting a power line indicator between the power station location and the power pole indicator or the underground power line indicator chosen by the player, wherein the underground power line indicator comprises:
        a three-dimensional rectangle and a hook removably coupleable to the power line indicator; and
        a magnetic material coupleable to an underground power line indicator; and
    performing an action indicated by an action card in response to crossing the action card by the power line indicator.

10. The method of claim 9, wherein connecting the power line indicator between the power station location and the power pole indicator comprises connecting the power line indicator between the power station location and an upright end of the power pole indicator.

11. The method of claim 10, further comprising connecting the power line indicator between the upright end of a first power pole indicator and an upright end of a second power pole indicator.

12. The method of claim 9, further comprising distributing an amount of monetary indicators to a player at a beginning of the player's turn corresponding to a number of buildings claimed by the player.

13. The method of claim 9, further comprising collecting an amount of monetary indicators from a player for each power pole indicator purchased by the player.

14. The method of claim 9, further comprising declaring a winner based on a value associated with the number of building indicators, power line indicators and underground power line indicators used by each player.

15. The method of claim 9, further comprising terminating game play when a player connects the power station location to the target building location with a power line indicator via one or more of the power pole locations or the underground power line locations.

16. An apparatus for playing an educational game for teaching power distribution, comprising:
    a game board that includes building locations, a power station location, power pole locations, underground power line locations and a target building location;
    a power line indicator connectable between the power station location and the target building location via one or more of the power pole locations and the underground power line locations;
    a power pole indicator coupleable to the game board at the power pole locations; and
    an underground power line indicator coupleable to the game board at the underground power line locations.

17. The apparatus of claim 16, further comprising actions cards located between adjacent power pole locations.

18. The apparatus of claim 16, further comprising miniature buildings located on the building locations.

19. The apparatus of claim 16, wherein the power line indicator further comprises an elongated line stored on a spool and having a miniature figurine at an end of the elongated line and coupleable between the power station location and power pole indicator.

20. The apparatus of claim 16, wherein the power pole indicator comprises a stand configured to support a power pole indicator in an upright position in the stand.

* * * * *